United States Patent [19]
Sanders

[11] Patent Number: 5,734,831
[45] Date of Patent: Mar. 31, 1998

[54] SYSTEM FOR CONFIGURING AND REMOTELY ADMINISTERING A UNIX COMPUTER OVER A NETWORK

[75] Inventor: James B. Sanders, Menlo Park, Calif.

[73] Assignee: Sun Microsystems, Inc., Mountain View, Calif.

[21] Appl. No.: 639,129

[22] Filed: Apr. 26, 1996

[51] Int. Cl.$^6$ .................................................. G06F 17/00
[52] U.S. Cl. ........................................................ 395/200.53
[58] Field of Search ............................ 395/200.53, 200.5, 395/200.51, 200.52, 712, 762, 651, 652, 653; 364/131, 133; 340/825.15

[56] References Cited

U.S. PATENT DOCUMENTS 5,426,421  6/1995  Gray .................................... 340/825.15

*Primary Examiner*—Ellis B. Ramirez
*Attorney, Agent, or Firm*—Blakely Sokoloff Taylor & Zafman

[57] ABSTRACT

A forms based browser interface system for configuring and administering a network server from a remote location. Using forms, such as hyper-text markup language forms, the system provides a graphical user interface that allows a novice user, unaware of the platform, architecture or even operating system of the network server, to transact administrative tasks on the network server. An interfacing computer, at which the novice user performs administrative tasks upon the network server, is connected to the network server via network connections. The interfacing computer is equipped with a browser program that can display and interact with the forms created by the network server. The forms allow the user to select among various administrative tasks to be performed on the server. The forms also allow the user to input parameters for administration of the server such as new account names when adding new accounts for the server. Once the form input is submitted over the network connections to the network server, scripts within the server pass this information as parameters to appropriate software that complete the execution of the task and may signal to the user at the interfacing computer, through messages on the forms, success or failure thereof.

16 Claims, 8 Drawing Sheets

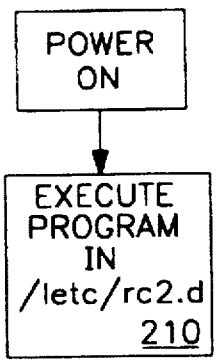
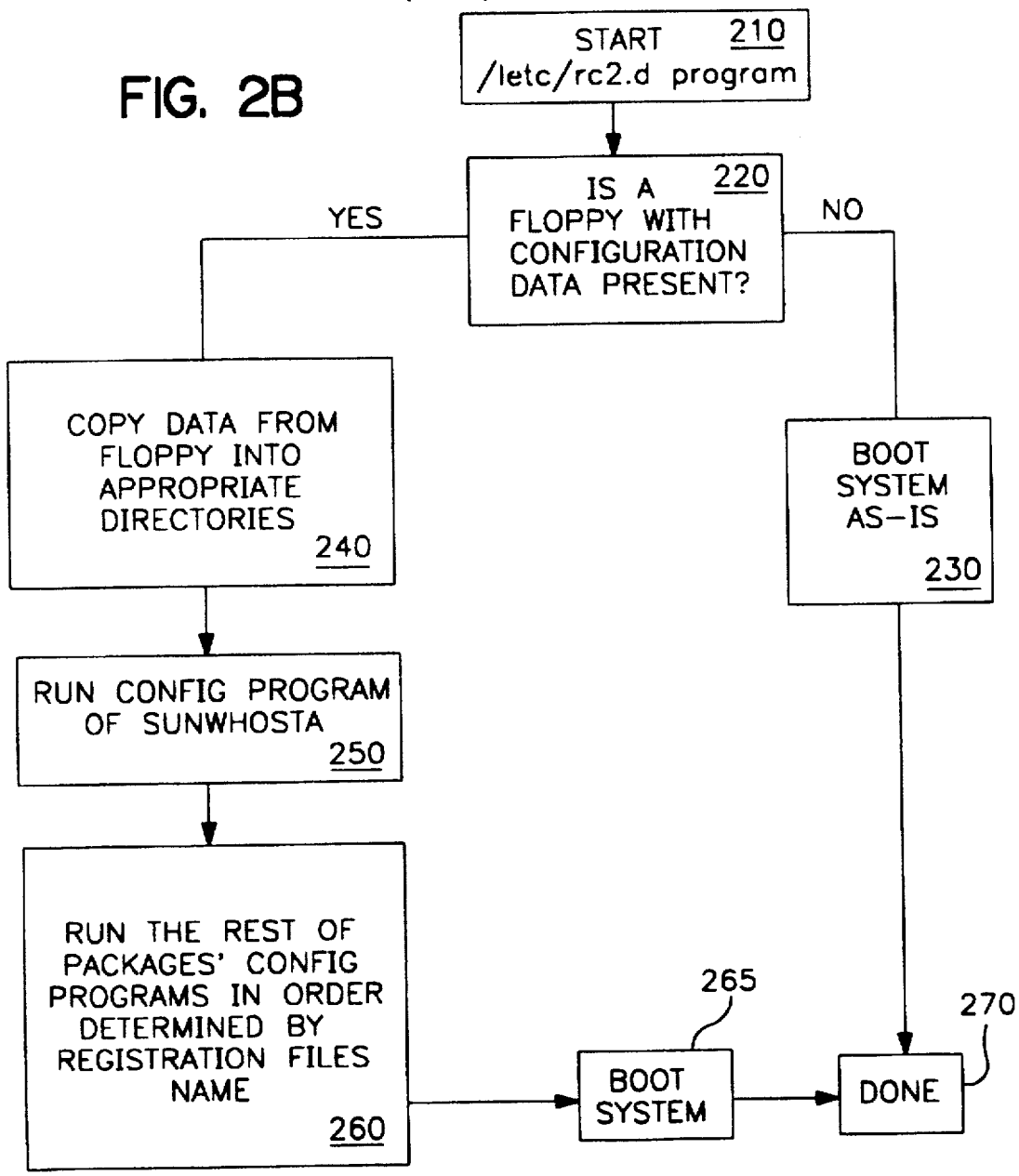
FIG. 2A
FIG. 2B

SYSTEM FOR CONFIGURING AND REMOTELY ADMINISTERING A UNIX COMPUTER OVER A NETWORK

BACKGROUND OF THE INVENTION

1. Field of the Invention

The present invention relates to the field of configuring and administering computer systems. More particularly, the present invention relates to automating the configuring of computers and administering computers using a graphical user interface from a remote location.

2. Description of Related Art

Certain computer systems such as those running in the UNIX operating environment are sufficiently complex that they have traditionally required specially trained technicians to configure and administer them.

Configuring and administering a UNIX computer system has always been a specialized job requiring the know-how of a trained technician with a thorough knowledge of UNIX. The level of training and know-how required to successfully perform these tasks increases when the UNIX machine is connected to a network, and further increases when the UNIX computer is to be used as a server providing access to data and code for other machines connected over the network.

Further, in order to install and configure a UNIX-based computer, the computer must be connected to a monitor and an input device, usually a keyboard with which a UNIX trained technician must manually type commands. Thus, the operating system, system utilities and some software applications that run on the UNIX system cannot be made available for use without the help of a UNIX trained technician working at the site of the server. A UNIX computer with devices such as disk or tape drives requires, for instance, complicated configuration known as "mounting" such that the operating system and software can recognize and use the drives. Similarly, networking interfaces such as a TCP/IP stack or packet drivers must be configured upon the installation of the operating system and/or the communications software that uses them such that File Transfer Protocol (FTP) or Telnet may operate correctly. When the UNIX computer also operates as a server, then the server software must be correctly installed and configured to run administrative tasks such as file permissions and setting up user accounts. This has typically required a system administrator with experience in such features as shell scripts and daemons (for file systems and E-mail). Even when administrative tasks are made available to a system administrator, however, they must be performed using a terminal at the physical location of the server.

Thus, there is need for a method and apparatus that circumvents the need for trained technicians in order to configure and remotely administer computers such that persons not trained in the operating system or platform of the computer can perform these tasks graphically and remotely.

SUMMARY

The present invention is a method and system for automating the initial configuration of a computer system and providing for remote ongoing administration of the computer system, particularly when the system is UNIX-based network server.

The server is configured using information on a removable media such as a diskette for use over a network. The server then self configures "packages" containing administrative software and system utilities for the server, according to an order established by the server file system. Once the configuration is complete, a user may thereafter administer the network server from a remote location on an interfacing computer. Using forms, such as hyper-text markup language forms, the interfacing computer displays a graphical user interface, which is ideally a world-wide web browser, allowing a novice user, untrained and unaware of the platform, architecture or even operating system of the network server, to perform administrative tasks on the network server. The interfacing computer is connected to the network server via network connections and is equipped with a browser program that can display and interact with forms created by the network server. These forms allow the user to select among various administrative tasks to be performed on the server. Once a task is selected, such as when adding new accounts for access to the server, additional forms allow the user to input information concerning the task such as an account name. Once the input entered in the forms is submitted over the network connections to the network server, scripts within the server pass this information to appropriate software that complete the execution of the task and may signal to the user at the interfacing computer, through messages on the forms, success or failure thereof.

BRIEF DESCRIPTION OF THE DRAWINGS

FIG. 2 is a flowchart showing the steps involved in configuration of the server and its software.

DETAILED DESCRIPTION OF THE INVENTION

Figure 1:
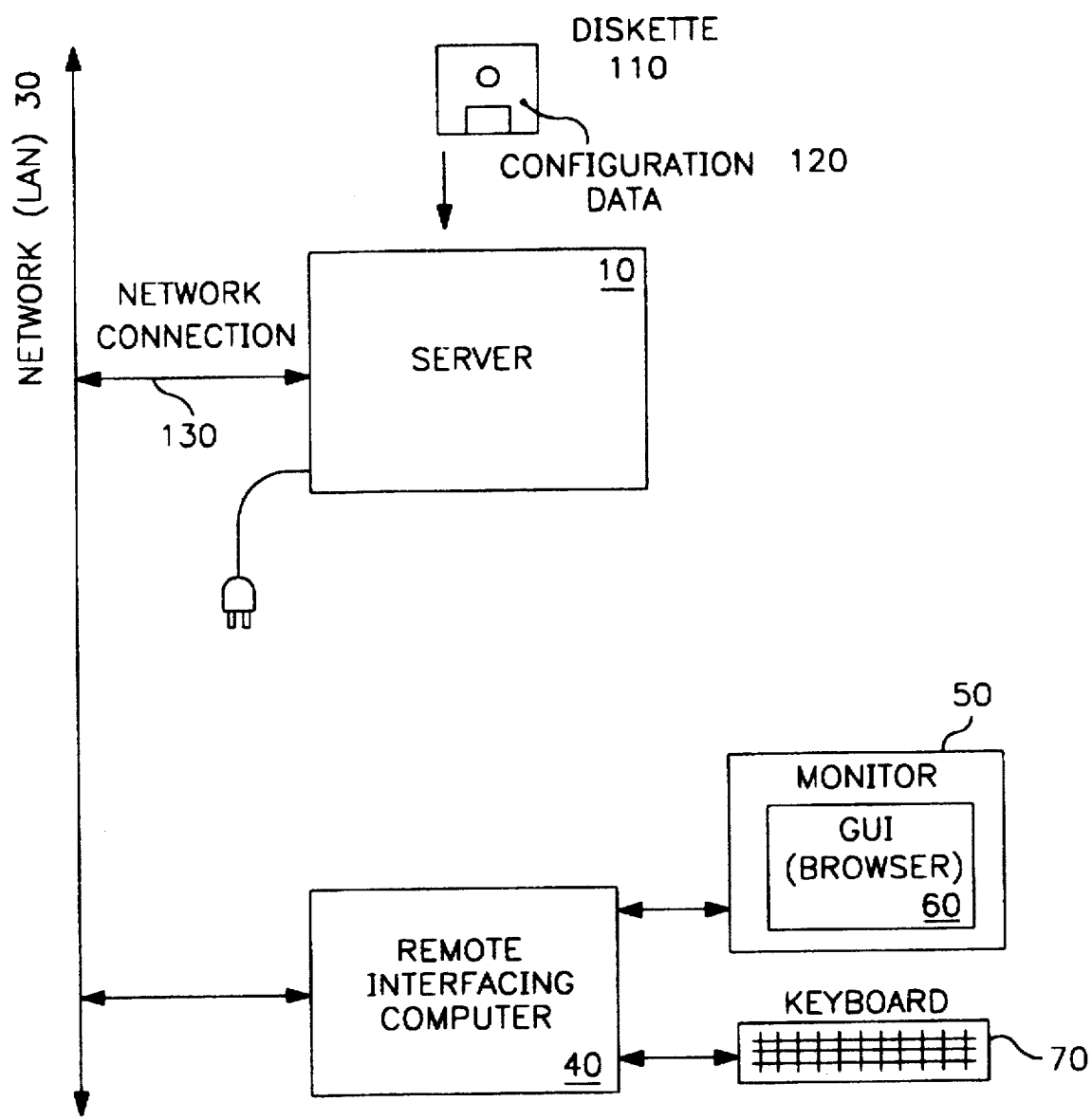
FIG. 1 is a diagram showing the main components of the interfacing system of the present invention.

FIG. 1 shows a system level diagram of the interfacing system. A UNIX-based computer requires specially trained and knowledgeable technicians such as System Administrators, to carry out such tasks as configuring devices and software of the computer. Further, when the computer is used as a server 10 for access over a network 30 via a network connection 130, the tasks of configuring the software of the server 10, according to the prior practice, require even more skill.

Assuming the base operating system of the server 10 has been installed, a diskette 110 containing configuration data 120, particularly network configuration data, such as an Internet Protocol (IP) address, Domain Name Server (DNS) information and/or packet drivers related to network connection 130 may be used for configuring the server 10 to communicate with other computers, over the network 30. The "packages" (software) in the server will read and process the configuration data 120 from the diskette 130 and automatically configure the computer as, for example, a World-Wide Web (WWW) server that uses Hyper Text Transport Protocol (HTTP).

Thereafter, any user of remote interfacing computer 40, regardless of what operating system the remote interfacing computer 40 runs or what platform the remote interfacing computer 40 is based upon, will be able to perform the ongoing administration of the server 10. The administration can be handled by a Graphical User Interface (GUI) 60 such as forms accessed through WWW "browsers" such as Netscape Navigator™ (a product of Netscape Communications Corp.). The server 10 will be HTTP capable and translate commands or requests issued over the network 30 by the remote interfacing computer 40 employing its GUI 60. When GUI 60 establishes a "link" (successful network connection) with server 10, the GUI 60 becomes a browser interface for sending commands and receiving information from the server 10. An operator can, by the use of a monitor 50 which displays the GUI 60 and a keyboard or input device 70, run administrative tasks by inputting information through menus or simple selections on the GUI. The input from the GUI is "submitted" (transmitted) to the server which then translates the input into a form utilized by commands native to the server 10. "Scripts" (self-executing programs) on the server 10 invoke whatever commands and packages are necessary to perform the task entered by the user and return success or error messages.

Figure 8:
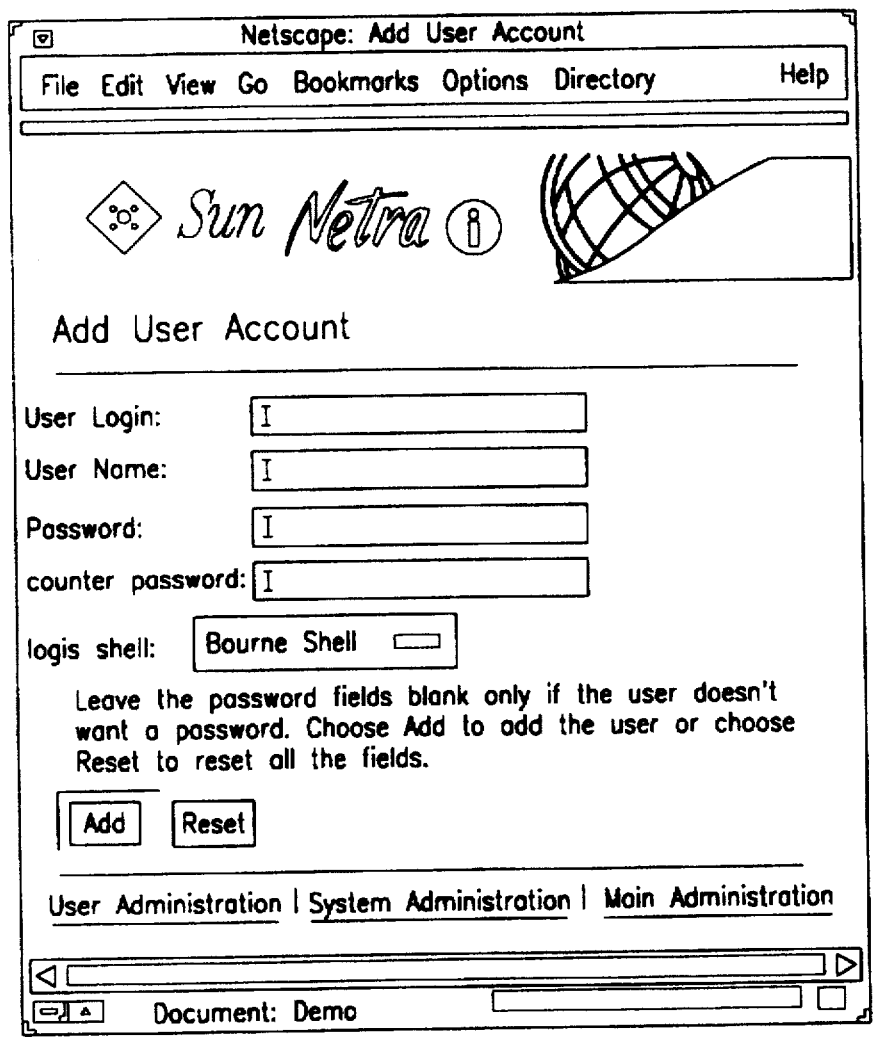
FIG. 8 is a screen capture of a sample graphical user interface administrative screen for adding users of the screen according to the present invention.

For example, to add a new user account for access to the server 10, the GUI 60 may have an icon entitled "Add User Account," whereupon a simple click would bring up a dialog box asking, for instance, a user name and password. FIG. 8 shows such an arrangement. Upon entering the user name and password, the server 10 would receive the information over the network connection 130 and pass it along as parameters to a series of UNIX or "C" commands and packages invoked through self-executing scripts. Upon successful completion of the shell scripts and commands necessary to create user directories, set the password, create login files, and any other tasks necessary to complete the adding of a new user account, the server 10 can send back to computer 40 a "User Added Successfully" designation, which then flashes on the monitor 50 or perhaps, through the use of audio interfaces, simulates speech that extols "User Added Successfully." This example is described in greater detail later with respect to FIG. 8. In a similar manner, any and all type and number of administrative and/or UNIX tasks can be implemented using graphical menus and dialogs through the GUI 60 that are simple in that they require no knowledge of, nor use of the platform or operating system server 10 operates on.

The GUI 60 can merely be a browser-capable page that allows the user to graphically interact with the server 10. Server 10 must contain or generate the necessary forms such as HyperText Markup Language (HTML) pages, which a browser such as Netscape Navigator™ (a product of Netscape Communications Corp.) can then access. Thus, by "linking" to the server 10, any remote interfacing computer 40 that has an HTML browser can display forms that provide administrative command level access to the server 10, without any UNIX system resident in remote interfacing computer 40. The only requirement is that the computer 40 be implemented with TCP/IP or other networking capability to access the server 10 through network 30. Implementing computers with such capability is well known in the art and will not be described in detail.

Using a remote interfacing computer 40, the server 10 is allowed to be a "headless" server, that is, a server without a terminal display or any physical input devices such as keyboards or mice, since it can be fully administered and reconfigured from a remote location. Though the embodiment discussed herein relates to the example of server 10 being a UNIX-based server, the method and system for the interfacing system of the present invention may be employed on any servers of any platform, such as a DOS (Disk Operating System) or Macintosh.

FIG. 2 shows a simplified flowchart of the initial booting and configuration process. When the power of server 10 is turned on, an initialization script is run out of the directory /etc/rc2.d (210) where "/" designates the root directory of the server file system. The system is queried as to whether a floppy with configuration data is present (220). If not, the system will boot as-is (230). If a configuration floppy is found, the script will copy the configuration information from the floppy and place it into the appropriate administrative "package" directories (240) into files with an extension ".cf" (For example, in the case of the Domain Name Server package, SUNWdnsA, the configuration file would be /etc/opt/SUNWnak/packages/SUNWdnsA/conf/dns.cf. The entire file system is described in detail later.)

After all the data is read and copied from the diskette into each package's corresponding ".cf" file, the/etc/rc2.d or other script then invokes the configuration program of SUNWhostA which is a package that sets the name of the server and other critical information (250). Then, the script invokes the rest of the packages' configuration programs in a sequence determined by the leading digits of the registration file name resident in a registry for each package (260). Each step in the configuration sequence involves sequentially invoking each package's configuration program. Each package's configuration program then reads the package's ".cf" file containing configuration information read from the diskette. Thus, the package SUNWdnsA will have a program /etc/opt/SUNWnak/packages/SUNWdnsA/bin/config performing the configuration according to the corresponding ".cf" file. Critical packages, such as SUNWnetA, which configure the networking interface, should be first configured so that administrative tasks may be performed over the network from a remote location. After the configuration of all packages is performed and the server has booted (265), the system is considered fully configured (270) and users can connect the server using port 80 (standard HTTP anonymous user port) over the network 30 to merely use the server, or connect to port 81 (administrative port) to begin administration of the server.

Figure 3:
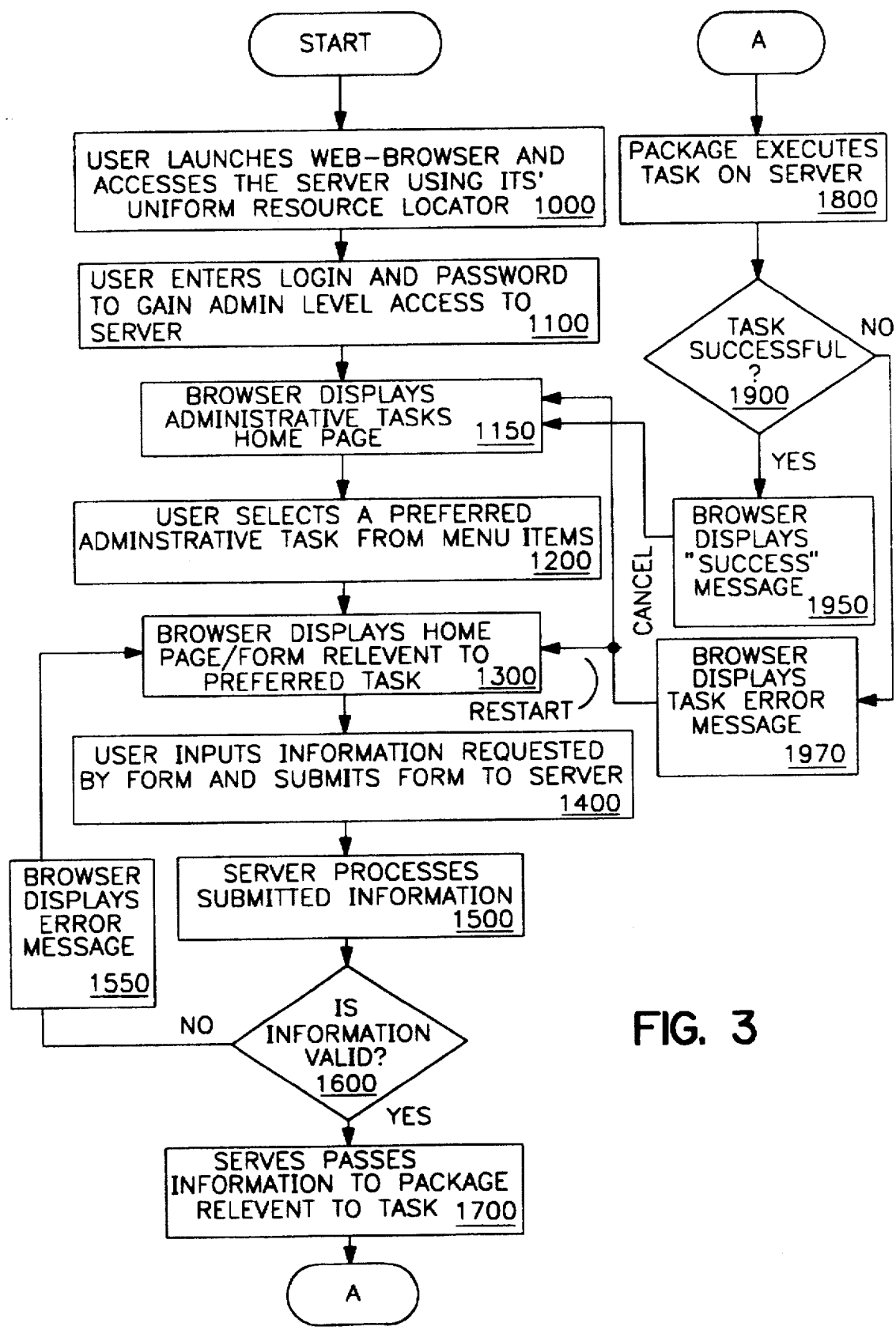
FIG. 3 is a flowchart showing the steps in administering the server from a remote location on an interfacing computer.

FIG. 3 shows an overview of the steps involved in carrying out the remote administration of the server from the interfacing computer.

Starting with step 1000, it is assumed that the server, "xyz", has been previously configured via diskette (as shown in FIG. 1) so it can at least be accessed from the network according to the steps described with respect to FIG. 2. In step 1000, the user launches a WWW browser on the remote interfacing computer and invokes "http://www.xyz.abc:81" to access the HTML-based administrative user interface (at a main screen or home page) to the server "xyz" The designation "www.xyz.abc" is the Uniform Resource Locator (URL) that any user with a WWW browser and necessary networking feed can connect with to get access to the server. In step 1100, the user enters an appropriate login and password to access server xyz's HTML-based administrative forms and pages. Once in the top level form for system configuration and administration, according to step 1200, the user selects the administrative task that they prefer to pursue, such as FTP configuration or new user addition. According to the task selected, in step 1300, the user will be presented with one or more task relevant HTML forms that let the user specify configuration or administration information. According to step 1400, the user then fills in the required form and "submits" it to the server over the network by activating, for instance, a "submit" icon/button provided on the form.

In accordance with step 1500, information submitted through these HTML forms is transmitted over the network to the server where scripts process the submitted information and either accept or reject it (step 1600). If information is rejected, error messages are displayed back to the user (step 1550), and the input, submit, and validation process repeats until the transaction can be completed. According to step 1700, once the script gets valid input data from the user, the submitted data is passed on to the executables of the appropriate administrative package or UNIX commands corresponding to the task selected (step 1800). According to step 1900, upon completion of the task requested by the user, a message indicating successful task completion is transmitted to the user on the interfacing computer (1950). Similarly, if any errors occurred during task execution, an error message is transmitted to the user, and the user may restart or cancel the task (step 1970). Similarly, the steps mentioned above may be utilized for altering configuration of the server by changing the ".cf" files using input submittal in forms.

The process of form input, submittal, script processing, and program invocation can be repeated/modified for any number of tasks to accomplish ongoing configuration and administration of the UNIX system without the user having to type a single UNIX command or know anything about UNIX. Further, as is standard for HTML forms, the user will readily be able to escape back to any previous form or cancel the task entirely, if the user so chooses.

Several network "packages", such as FTP, are provided by the server 10 for use in enabling and controlling client or user access. The present invention will be described as working with SOLARIS™ (a product of Sun Microsystems, Inc.) as the underlying operating system, but one skilled in the art will appreciate that any operating system, properly outfitted, can underlie the network server and provide similar packages for network/server administration. Though pre-installed with certain packages, the server 10 can be equipped to dynamically add new packages as they are requested by or required for clients and users.

Among the basic services provided by the packages are Hyper Text Transfer Protocol (HTTP), Dynamic Host Configuration Protocol (DHCP), Internet Mail Protocol (IMAP) and Post Office Protocol (POP). Additionally, the server 10 will have a Domain Name Server (DNS) package providing name-server information such as the IP addresses of a cache server, a primary server and a secondary server. A "sendmail" service is also provided to give Simple Mail Transport Protocol (SMTP) functionality to the users of the server 10. In terms of administrative support, server 10 is configured to provide asynchronous Point-to-Point Protocol (PPP) setup, File Transfer Protocol (FTP) setup, added security (for granting super-user or ordinary user access to the server over the network) and access to newsgroups or Gopher information services, and the ability to add user accounts for mail and web access. In terms of configuration support the following functionality is exemplary: IP addressing, netmask, default route schemes, root passwords, date, time and timezone setting.

Figure 7:
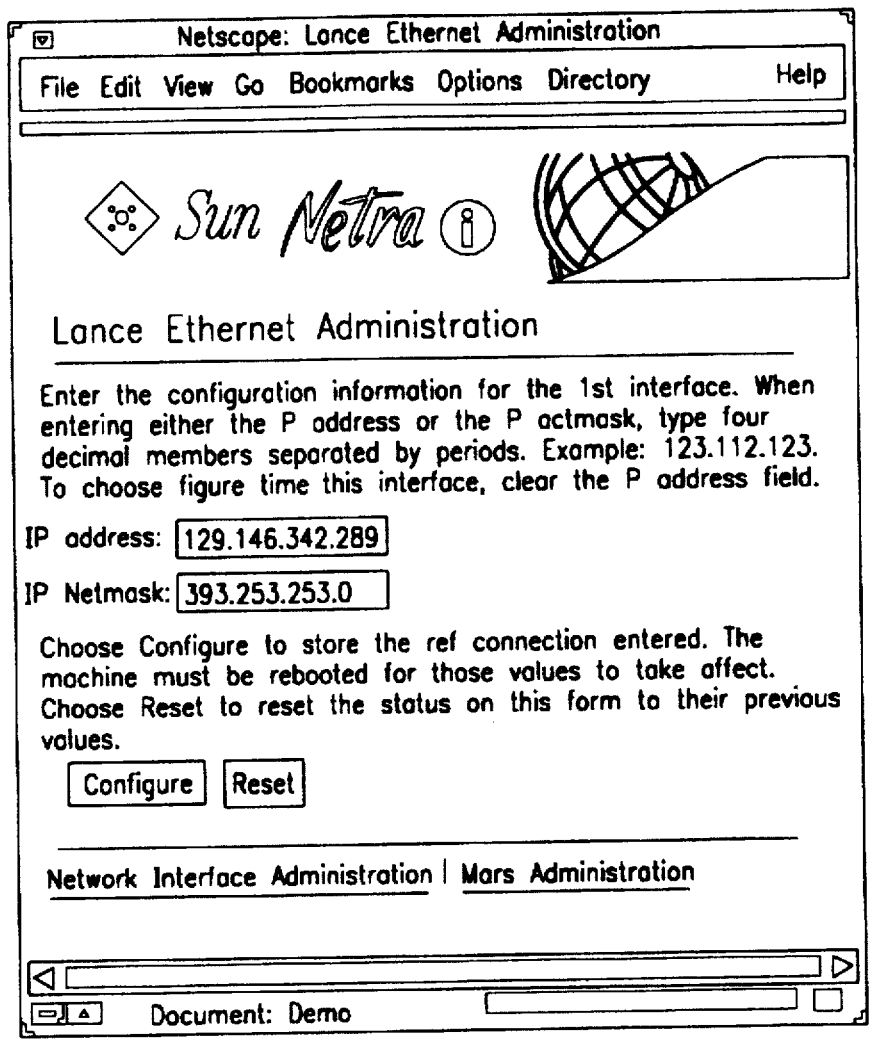
FIG. 7 is a screen capture of a sample graphical user interface administrative screen for network configuring according to the present invention.

The server 10 has a daemon to produce HTML documents that can be routed via HTTP so that the user may employ any HTML browser they desire at the remote interfacing computer 40. Thus, running under port 81, rather than the standard HTTP access port 80, the daemon can prevent access from any hosts other than those in the local domain (designated by matching certain IP masks). The daemon also provides security such that users must authenticate themselves using a password to gain super-user or administrative type access to the server 10. HTML forms provided for packages of the server are then used by authenticated users over port 81 to handle all the administrative upkeep of the server 10. For example, FIG. 7 is a screen capture of a Netscape Navigator™ displayed HTML form that sets Internet Protocol (IP) configuration for ethernet operation that is remotely administered according to the present invention.

FIG. 8, likewise, is a screen capture of a Netscape Navigator™ displayed HTML form that adds new user accounts. An alternative embodiment may provide a VT100 emulation or PC terminal program so that administrators can also enter commands and administer the server 10, if they so choose, using Telnet or direct modem dial-up. Thus, a TTY-based web client is necessary to translate enough HTML tags to, at a minimum, display text and get input from forms in the case of only a cursor-addressable terminal.

Further, the "remoteness" in terms of distance is not critical to the invention as the interfacing computer 40 may be in the same room as or provided along with server 10.

A. Overall Framework of the Server

A "framework" for the file system of the server is described in this section as it relates to package configuration and use. These "packages" are the primary software invoked to handle auto-configuration of the server 10 and, subsequently, are invoked during the remote administration of the server 10 over network 30. Administrative packages can be configured through the HTTP interface quickly and easily, thereby eliminating the need to configure the package where the server 10 is physically located. The framework is referred to as "SUNWnak" (Network Appliance Kit) in Solaris™ (a Sun Microsystems operating system) terminology and has, in the files system area, static information as shown in Table I below.

TABLE I

| Static Information residing at /opt | |
|---|---|
| SUNWnak/cgi-bin/ | Contains HTML forms work, such as main,.cgi |
| SUNWnak/html/ | Various HTML pages |
| SUNWnak/icons/ | Various xbm icons |
| SUNWnak/images/ | Various GIF/JPEG images |
| SUNWnak/audio/ | Package-related audio files |
| SUNWnak/bin/audio | Program to play audio files at a specified volume |
| SUNWnak/bin/config | Program to call configuration programs of other packages |
| SUNWnak/bin/startup | Run at boot-time to check configuration and update from disk if necessary |
| vendor | Symbolic link to vendor-specific "personality package" |
| vendor-proto | Prototype of a vendor package that ships with the computer |

Figure 4:
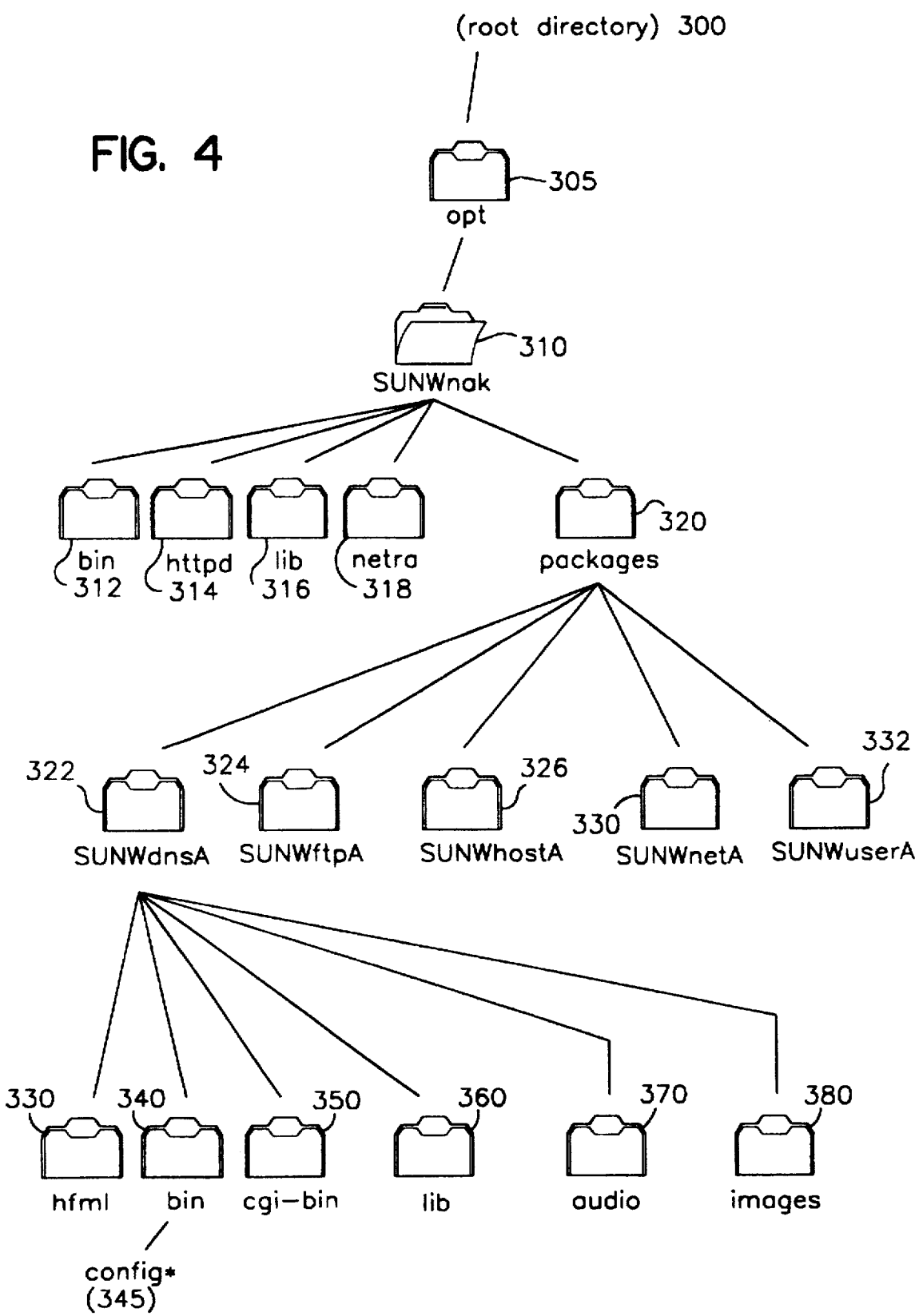
FIG. 4 is a chart showing the directory tree structure of static package information.

FIG. 4 shows the directory structure in which the static information specified in Table I for SUNWnak resides. Following down the tree in FIG. 4, from a root directory "/" (300) to "opt" (305) and finally to "SUNWnak," a number of subdirectories reside. First, the "bin" subdirectory (312) contains the binary (executable) files that are the base level commands of the framework such as the "config" program for calling configuration programs of the various packages.

The "httpd" subdirectory (314) contains more advanced executables for maintenance and setup of the server as a Web server. The "lib" subdirectory (316) contains libraries and utilities for running the various package configuration scripts. Finally, the Netra™ (a trademark of Sun Microsystems) subdirectory contains vendor-specific images and forms which can customize the administrative pages of the Web server. The "packages" subdirectory (320) contains a number of subdirectories, one for each package.

For example, FIG. 4 shows five such package subdirectories. The SUNWdnsA, SUNWftpa, SUNWhostA, SUNWnetA and SUNWuserA packages each have directories, 322, 324, 326, 330 and 332, respectively. For an explanation describing what tasks each of these packages perform, see the discussion under Section B, entitled "Administrative Packages".

Table II below shows that the SUNWnak framework also provides for dynamic information in a separate file system area, namely "/etc/opt/sunwnak." Here, vendors and value-added resellers may add their own customized packages or package add-ons according to their needs.

TABLE II

| Dynamic Information residing at etc/opt/SUNWnak | |
|---|---|
| vendor | Symbolic link to vendor-specific data area |
| vendor-proto | Prototype vendor data area |
| registry/ | Directory containing package registration information |
| conf/ | Configuration directory |
| conf/SUNWnak.cf | Configuration file |
| logs | Various log-files |

Figure 5:
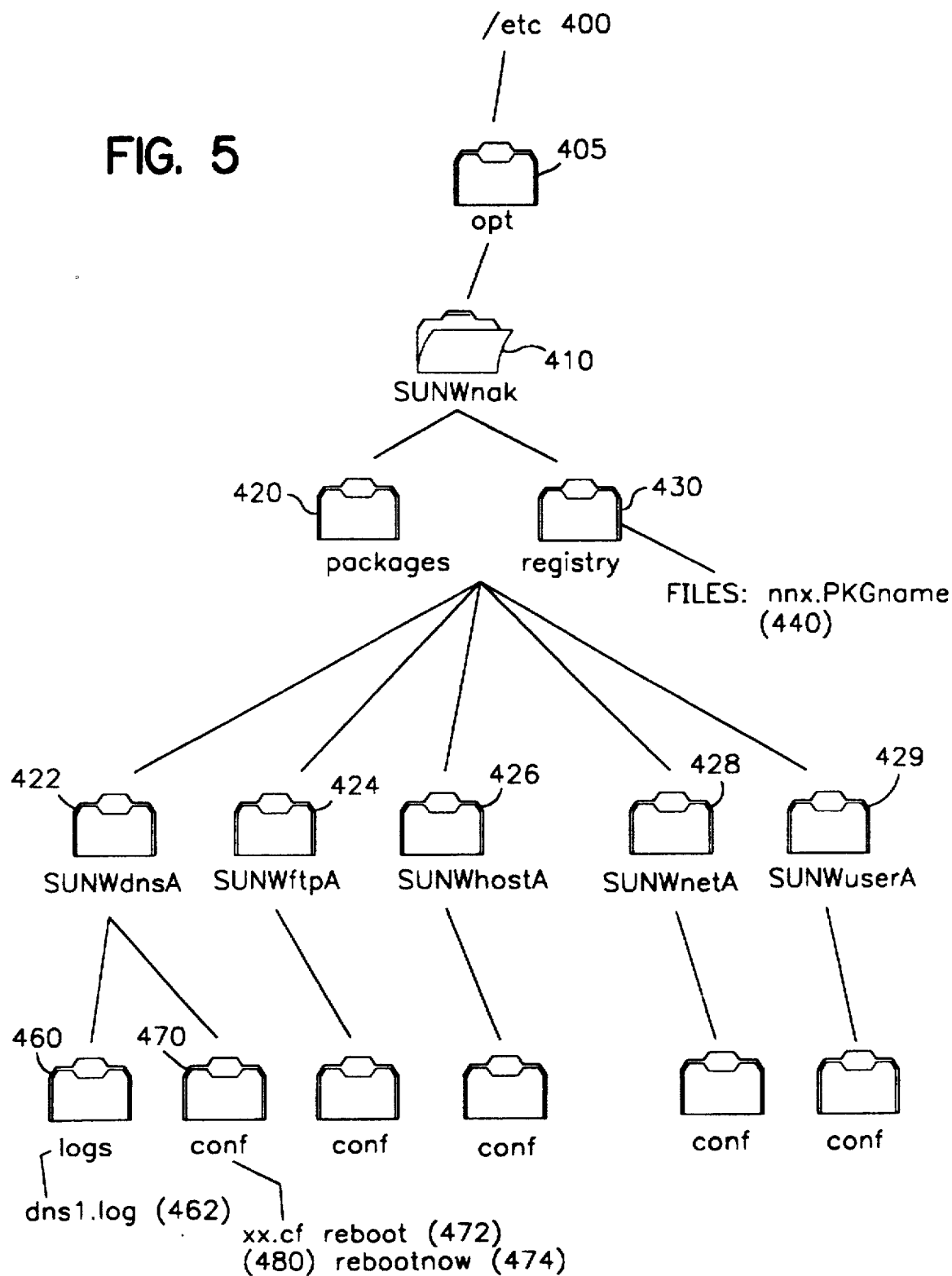
FIG. 5 is a chart showing the directory tree structure of dynamic package information.

FIG. 5 shows the directory structure in which the dynamic information specified in Table II for SUNWnak resides. Following down the directory tree from "/etc" (400) to "/etc/opt" (405) and finally to "/etc/opt/SUNWnak" (410), there are two subdirectories. The "packages" directory (420) has a subdirectory for each of the packages referred to in FIG. 4, (for an explanation of the tasks performed by these packages, refer to Section B, entitled "Administrative Packages".) The "SUNWdnsA" package directory is shown to have a "conf" subdirectory (470) which contains configuration file(s) such as "xx.cf" (415) where xx is an arbitrary designation and the empty files "reboot" (472) and "reboot now" (474). The "SUNWdnsA" package directory is also shown as having a "logs" subdirectory containing log files such as "dns1.log" (462) which may have error messages during configuration on typescripts of sessions when the corresponding package, in this case SUNWdnsa, is run. Each of the other packages, SUNWftpa, SUNWhostA, SUNWnetA and SUNWuserA have similar corresponding directories 422, 424, 426, 428 and 429, respectively, and like SUNWdnsA, each of these directories also have "conf" subdirectories and "logs" subdirectories (not shown).

By splitting the dynamic and static information into separate directories, back-up of /etc/opt/SUNWnak, which contains all the data necessary for restoring/recovering the configuration, can be achieved more efficiently. The static data and executables can be recovered from original software packages rather than having to back-up the executables and static data along with the dynamic data.

Using this framework, packages are also configured in the appropriate order and further, using the registry, HTML administrative forms are more easily organized according to registry entries.

B. Administrative Packages

As shown in FIGS. 4 and 5, each administrative package is installed into a subdirectory of /opt/SUNWnak/packages (320) and /etc/opt/SUNWnak/packages (420). A particular package's files are installed in two places: 1) under the /opt/SUNWnak/packages tree where the static data resides and 2) under/var/opt/SUNWnak/packages where all the logs and configuration files reside. A particular feature of this invention is package registration, which will be described in detail later. The name of each package must be registered in a "registry" file under a registry directory as "/var/opt/SUNWnak/registry/nnX.PKGname" (described later).

Every package must have two files. The first is bin/config (330), which is an executable program used for setting and testing configurations of the package, and the second is the HTML index or "home" page of the package.

Among the five packages illustrated by their directories in FIGS. 3 and 4 are SUNWdnsA, SUNWftpA, SUNWhostA, SUNWnetA and SUNWuserA. So as not to obscure the focus of the present invention, only a brief description of their function will be described. The SUNWdnsA package sets up the Domain Name Server information for the server 10, with the IP addresses and masks specified by the user or automatically by the configuration diskette. The SUNWftpA package sets up the server 10 as having FTP send and receive functionality. The SUNWuserA package manipulates user information such as passwords and login shells and its source code is detailed in Appendices A and B. The SUNWnetA configures the server 10 for network interface and capability. FIG. 7 shows a typical administrative form which configures ethernet IP addresses. Thus, all of these packages when called through an HTML form at the remote computer provide complete administrative functionality with an ease-of-use provided by the graphical user interface.

C. Package Registration

Figure 6:
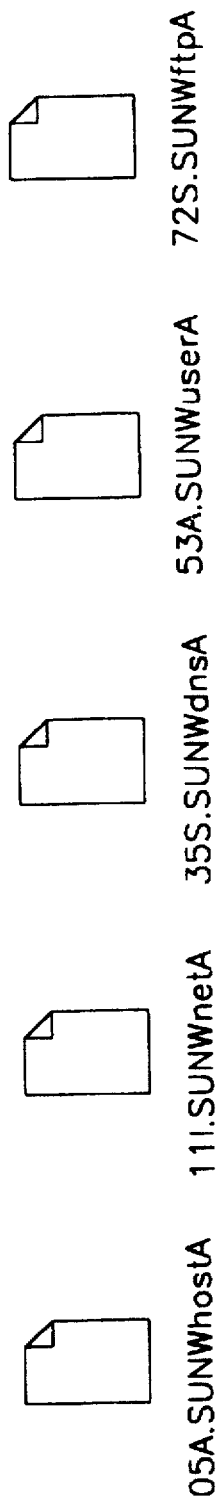
FIG. 6 is an illustration of various package registration files contained in the registry.

All packages are registered with the framework through a registry. The directory /etc/opt/SUNWnak/registry (430), shown in FIG. 5, contains registration information for all of the administrative packages. Within this directory are a number of registry files, one for each package. The file name looks like nnX.PKGname (440) where nn is a number between 00 and 99 and merely determines the order of package auto-conform using the boot-up process, X is a package type identification (e.g., "I" for network interface), and PKGname is the name of the package. FIG. 6 shows registry files for each of the packages described earlier. Within each file is a one-line text string, for example, "DHCP—Dynamic Host Configuration Protocol." These package text strings are used as labels by the HTML link that invokes the package's administrative form. Each of these package registration files are used for sequencing the auto-configuration of the packages, shown in FIG. 4. The packages are sequenced according to the alpha numeric sort order where nn=00 is first and nn=01 is second, and nn=02 is third and so on. Thus, in FIG. 6, SUNWhost is configured first, then SUNWnet, etc. By using a directory command, such as "ls" in the registry directory, the user can see what order the packages are configured in.

Furthermore, when the leading digits of the registry files are extracted during generation of the HTML forms, these registry forms provide an efficient way of determining which menu items and forms occur/display in what order at GUI 60.

D. Configuration

Each administrative package may use configuration information, either from a service provider or as a result of the user filling out HTML forms. In order to simplify delivery, backup and restoration of the packages' configuration, initial configuration information can be stored on diskette or other removable media. Referring to FIG. 5, the configuration files for the administrative packages reside in the directory /etc/opt/SUNWnak/packages/PKGname/conf (470). Each configuration file will end with the suffix ".cf" and have the form "xx.cf" (480).

When saving configuration information, the framework copies the contents of the package's conf directory, for example, "/etc/opt/SUNWnak/packages/SUNWdnsA/conf" (470) to a directory called "PKGname" on the diskette and overwrites configuration information already residing there. Each administrative package must have an executable file bin/config (345), as shown in FIG. 4, for manipulating and processing its configuration information. The following program options are preferred:

- -c configures the package according to the .cf files.
- -t testing to insure that the semantics of the .cf files are acceptable without modifying any of the files. This option will return a status code.
- -u "unconfigures" all changes it has done to the system files.
- -v returns the package's version information.

The configuration program will return a status code indicating whether the action was successful or not. Further, this status code, between 0 and 255, with a 0 indicating an okay, and each of the numbers from 1-255 indicating a specific error, such as when the config file is missing or corrupt or when a package is not installed properly, provide feedback to the user on package configuration. Each of these options are provided to the user via configuration HTML forms similar to administrative HTML forms described earlier. Further, the status codes returned can be transmitted to the page accessed by the user to notify the user of the configuration status.

If the action taken by the configuration program requires that the machine be rebooted before the new configuration occurs, the configuration program must write an empty file "reboot" (472) in its conf directory. The framework will recognize this file, continue with any other package configuration it needs to, remove the "reboot" (472) file, and then reboot the server.

If the configuration program requires that the server be rebooted immediately, before any other package configuration commences, the config program must write an empty file "rebootnow" (474) in the corresponding package conf directory. The framework will remove the file, remember what position it occupied in the configuration list, and reboot the server. When the machine reboots and the initialization program is run from /etc/rc2.d, if it sees a marker that indicates it was in the middle of a configuration sequence, the script resumes configuration. Once the configuration of packages is completed, the server continues boot-up.

E. Logs

Each administrative package should be able to keep logs of any tasks performed, typescripts of sessions and also any error messages that are returned. Package-specific log files reside in the corresponding "logs" directory for that package as is illustrated by the SUNWdnsA example in Figure B. Each administrative package can have functionality to display its log file, such as dns2.log (462) for SUNWdnsA, using a menu item (icon) on one of the package's HTML forms and the file can then be displayed as a customized HTML form based on the text in the log file. For instance, referring to FIG. 7, when the ethernet administration package encounters an error, a detailed error message may be stored in a log file for SUNWnetA, the package corresponding to ethernet set-up, for later viewing.

F. HTML

Scripts, which are called by the user via the HTTP server in response to an HTML "submit" menu selection, will also translate the form input submitted to the server into appropriate values in the package's xx.cf configuration file and then invoke the package's configuration program passing along the input submitted by the user as parameters inside the xx.cf file. In the FTP package using an HTML form interfaces, the parameters input on the form are written to FTP.cf and then the configuration program for the FTP package (SUNWffpa) reads the ".cf" file to get the parameters.

HTML forms, such as the "Add User Account" form shown in FIG. 8, allow a user at the remote interfacing computer to input information for adding a new account. Appendix A contains source code showing how this form may be generated. Referring to FIG. 8, input windows, one for the account's login name, another for the account user's real name, another one for the password, and so on are illustrated. Once the information is input into the windows, selecting the menu item "Add", as shown at the bottom of the screen, will "submit" the information over the network 130 and then the appropriate script(s) for that package on the server 10, in this case SUNWuserA, will run and the new user information will be passed as program parameters. The SUNWuserA scripts perform the necessary operations to get the new account ready, such as setting up directories for the new account, setting access permissions for the user of the new account, setting up a mail spooler or other related tasks. Appendix B contains source code showing how submitted information is processed and how UNIX operations necessary to add a new user account are performed.

G. The Main Form

The "main" form is the form referred to in step 1150 of FIG. 3 as the "Administrative Tasks Home Page" that is displayed to the user immediately upon login or after visiting the welcome or home page of the server. The main form is generated by an HTML command such as HREF= "/SUNWnak/cgi-bin/main.cgi" which then generates an HTML form with the following menu items:

- o Manage Interfaces
- o Manage Services
- o Manage Users
- o Manage Hosts
- o Advanced Management Selecting the "To Welcome" menu item takes the user back to the welcome or home page of the server. Each of the other five menu items will transfer the user to a different HTML page, which corresponds to the "home page relevant to preferred task" as mentioned in Step 1300. Selecting the "Manage Users" page allows administrators to add and manipulate user accounts on the server, provide mail service, or create logins for placing web pages. In the case of user accounts, a user account administrative page is then displayed on the screen from which the option "Add User Account" may be selected. Then, as shown in FIG. 8, the new account information can be configured. The "Hosts" page lets administrators add, delete or modify host entries via the domain name server and dynamic host configuration protocol. Selecting the "Advanced Management" menu item provides users with functionality for modifying the server system itself. The "Advanced Management" page has menu items such as:

- o Manage system parameters
- o Adjust audio volume (including OFF)
- o Install new software package o Save configuration o Restore configuration o Shutdown server Selecting the "Modify system parameters" menu item brings up an HTML page with the following menu items:

o Set IP address, netmask, default route o Set root password o Set date, time, and timezone The first item "set IP address . . ." may bring up a page similar to the one shown in FIG. 7. The administrative pages described, and others similar to them, are automatically generated by the packages and scripts, and can also be vendor-customized. The various administrative pages, whatever their appearance, allow easy remote administration of the server 10 using a WWW browser.

Many alternate embodiments of the present invention are possible, depending upon the needs and requirements of the machine to be administered, and the embodiment described above is merely an embodiment to be used by computers operating on the Solaris™ operating system which is a UNIX-based environment.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

APPENDIX A

```
Displays the "Add User Account" HTML form
#!/bin/ksh#pragma ident "@ (#)user1.cgi

# Variables

PKG=SUNWuserA

# Load the libraries

. /opt/SUNWnak/lib/nak.globals
. $PKGROOT/cgi-bin/usercommon.cgi

# Main

set +u
nak_html_head "Add User Account"
cat << _1EOF_
<FORM ACTION="${SUNCGI}${PKGCGI}/useradd.cgi"
METHOD="POST">
<PRE>
User Login: <INPUT NAME="user_login" VALUE="$1"
SIZE="30"> $5
User Name: <INPUT NAME="user_name" VALUE="$2"
SIZE="30">
Password: <INPUT NAME="user_pass_1" VALUE="$3"
TYPE="password" SIZE="30">$6
Reenter Password: <INPUT NAME="user_pass_2" VALUE="$4"
TYPE="password" SIZE="30">$6
<BR><P>Login Shell: <SELECT NAME="what_shell">
<OPTION VALUE="/bin/sh"> Bourne Shell
<OPTION VALUE="/bin/ksh"> Korn Shell
<OPTION VALUE="/bin/csh"> C Shell
</SELECT>
</PRE>
<BR>
<P>Leave the password fields blank only if
the user doesn't want a password.
Choose <STRONG>Add</STRONG> to add the user
or choose <STRONG>Reset</STRONG>
to reset all the fields.<BR>
<P><INPUT TYPE="submit" VALUE="Add"><INPUT
TYPE="reset" VALUE="Reset">
```

APPENDIX A-continued

```
</FORM>
<P><HR>
<A HREF="$PKGCGI/index.cgi">User Administration</A> |
<A HREF="$NAKCGI/system.cgi">System Administration</A> |
<A HREF="$NAKCGI/main.cgi">Main Administration</A>
</BODY>
</HTML>
_1EOF_
set -u
```

APPENDIX B

```
Processes info submitted by "Add User" form.
Performs UNIX operations to add per account.
#!/bin/ksh#pragma ident "@ (#)useradd.cgi

# Variables.

PKG=SUNWuserA

# Load the libraries

. /opt/SUNWnak/lib/nak.globals
. $PKGROOT/cgi-bin/usercommon.cgi

# Main

set +u
$(check_login "$WWW_user_login")
case $? in
1)
   exec $PKGROOT/cgi-bin/user1.cgi "$WWW_user_login"
   "$WWW_user_name"\
   "$WWW_user_pass_1" "$WWW_user_pass_2"
   "← Can't be empty."
   ;;
2)
   exec $PKGROOT/cgi-bin/user1.cgi "$WWW_user_login"
   "$WWW_user_name"\
   "$WWW_user_pass_1" "$WWW_user_pass_2"
   "← $WWW_user_login already exist."
   ;;
3)
   exec $PKGROOT/cgi-bin/user1.cgi "$WWW_user_login"
   "$WWW_user_name"\
   "$WWW_user_pass_1" "$WWW_user_pass_2"
   "← $WWW_user_login is invalid."
   ;;
*)
   $(check_password "$WWW_user_pass_1"
   "$WWW_user_pass_2")
   if [[ $? != 0 ]]
   then
     exec $PKGROOT/cgi-bin/user1.cgi "$WWW_user_login"
     "$WWW_user_name"\
     "$WWW_user_pass_1"
     "$WWW_user_pass_2" ""
     "← Two passwords don't match."
   fi
   typeset -i uid
   uid=100
   uidlist=$(awk -F: '{print $3}' /etc/passwd)
   notfound=1
   while [[ $notfound == 1 ]]
   do
     uid=$uid+1
     notfound=0
     for i in $uidlist
     do
       if [[ "$uid" == $i ]]
       then
         notfound=1
       fi
     done
   done
   if [[ ! -z "$WWW_user_pass_1" &&
```

APPENDIX B-continued

```
${#WWW_user_pass_1} -lt 6 ]]
then
exec $PKGROOT/cgi-bin/user1.cgi "$WWW_user_login"
"$WWW_user_name"\
"$WWW_user_pass_1" "$WWW_user_pass_2" ""\
"← At least six characters is required."
password=$($NAKPKGS/SUNWnak/bin/getpasswd
"$WWW_user_pass_1")
add_passwd_entry "$WWW_user_login" "$uid"
"$WWW_user_name"
"$WWW_what_shell"
add_shadow_entry "$WWW_user_login" "$password"
make_home_dir "$WWW_user_login"
;;
esac
set -u
nak_log info 0 "User $WWW_user_login has been created!"
nak_html_head "Add User Account"
cat << _1EOF_
<H2>User $WWW_user_login account has been created!</H2>
<BR>
<P>Choose one of the following links below.
<HR>
<A HREF="$PKGCGI/user1.cgi">Add User Account</A> |
<A HREF="$PKGCGI/index.cgi">User Administration</A> |
<A HREF="$NAKCGI/system.cgi">System Administration</A> |
<A HREF="$NAKCGI/main.cgi">Main Administration</A>
</BODY>
</HTML>
_1EOF_
```

What is claimed is:

1. A method for administering a network server over network connections using an interfacing computer, said method comprising the steps of:
    configuring the network server for use over network connections;
    configuring software packages on the network server for executing a set of administrative tasks on the network server;
    selecting on a first set of graphical user interface forms displayed a preferred administrative task from said set of administrative tasks;
    inputting of information, by a user, relevant to said preferred administrative task on a second set of graphical user interface forms at the remote location;
    submitting the user input over the network connections to the network server; and
    executing the preferred administrative task on the network server using the configured packages and commands native to the network server in a manner specified by the user input.

2. A method according to claim 1 wherein said step of configuring software packages is achieved in a predetermined sequential order.

3. A method according to claim 1 wherein the set of administrative tasks include reconfiguring the network server for use over network connections.

4. A method according to claim 1 wherein the set of administrative tasks includes adding a new user account.

5. A method according to claim 1 further comprising the step of validating the submitted user input prior to executing the preferences administrative task.

6. A method according to claim 5 where the step of validating includes displaying success and error messages to the user at the interfacing computer.

7. A method according to claim 1 wherein the network server runs in the UNIX operating environment.

8. A method according to claim 1 wherein the step of configuring the network server for use over network connections is achieved through a removable media provided to the server, said removable media containing configuration data.

9. In a computer system, an interface system for administering, from a remote location, a network server, said interface system comprising:
    a set of network connections;
    an interfacing computer at said remote location, said interfacing computer for transacting a plurality of administrative tasks on said network server over said set of network connections, said interfacing computer platform independent of said network server; and
    a graphical user interface coupled to said interfacing computer that correlates said administrative tasks of the network server to a set of menu items provided on forms displayed by said graphical user interface, wherein user input submitted through said menu items is translated on the network server to complete transactions of said administrative tasks.

10. The interface system of claim 9 wherein said network server is configured on the UNIX operating environment.

11. The interface system of claim 9 wherein said network server self-configures software necessary for connecting to said interfacing computer over said set of network connections.

12. The interface system of claim 9 wherein said network server requires no display device.

13. The interface system of claim 9 wherein said graphical user interface is a set of hyper-text markup language forms accessible through a world-wide web browser.

14. The interface system of claim 9 wherein said administrative tasks include configuring the network server to operate over said set of network connections.

15. The interface system of claim 9 wherein said administrative tasks include adding new users and modifying user information for existing users of the network server.

16. The interface system of claim 9 wherein said administrative tasks further include configuring the network server as a world-wide web server.

* * * * *